May 12, 1936.　　　A. C. LINDGREN　　　2,040,699
HARVESTER THRESHER
Filed March 15, 1935　　　3 Sheets-Sheet 1
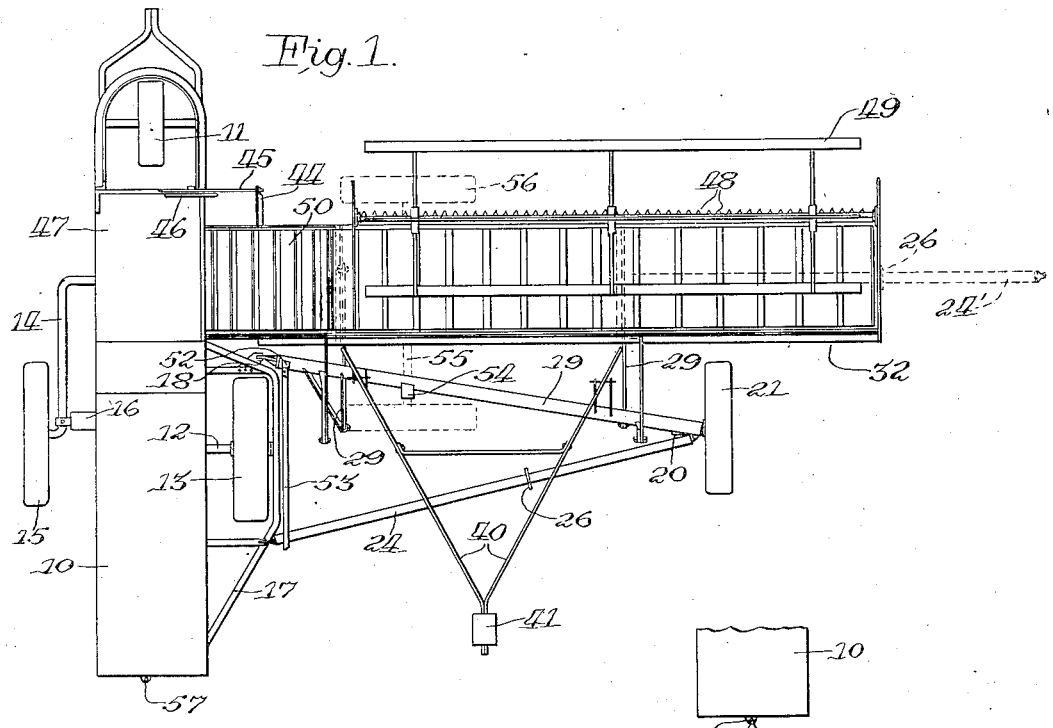
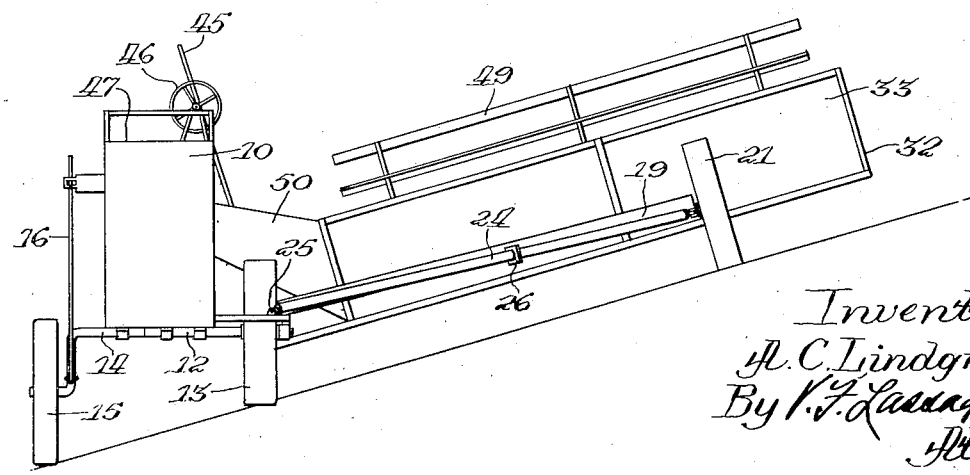

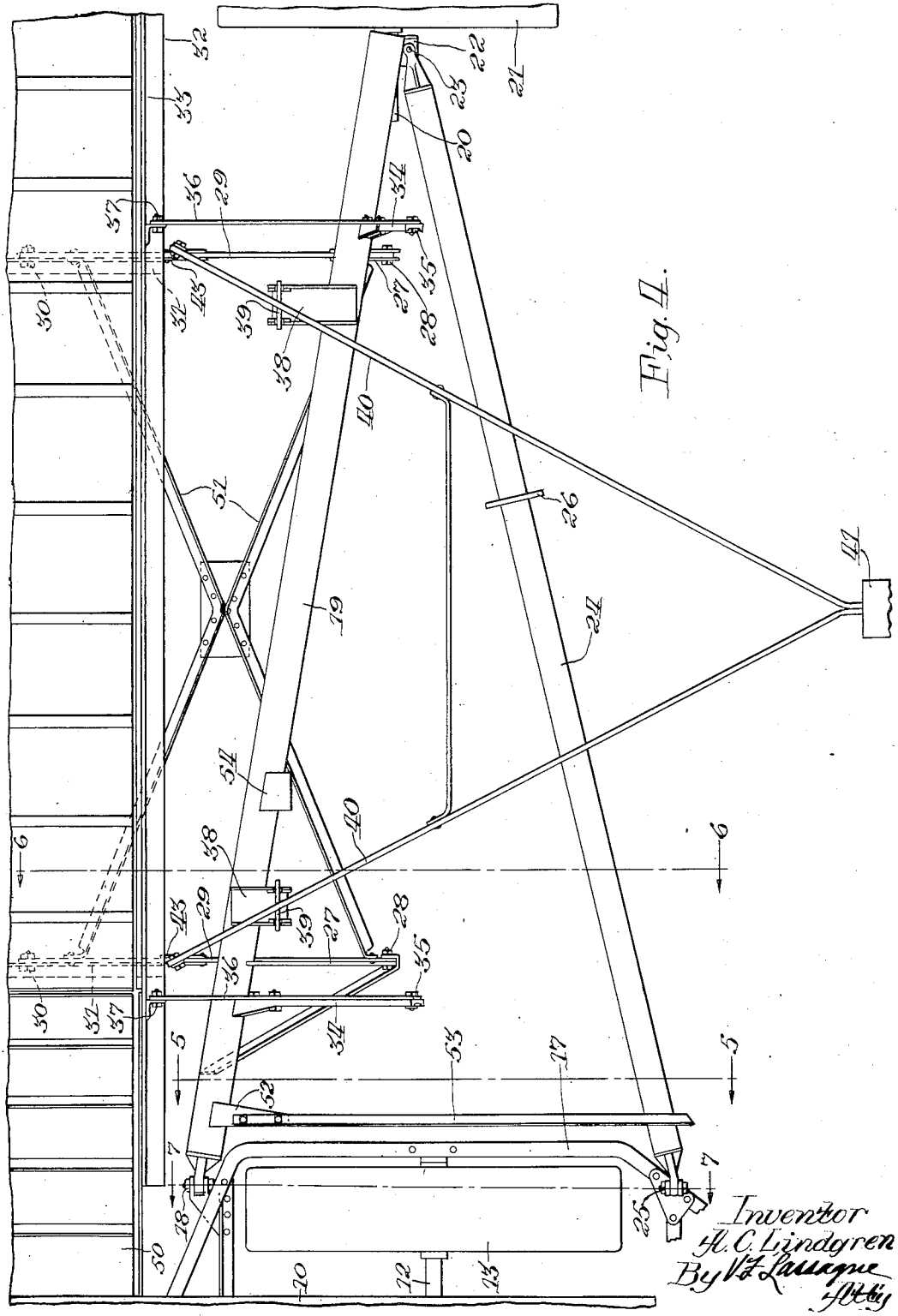

May 12, 1936.  A. C. LINDGREN  2,040,699
HARVESTER THRESHER
Filed March 15, 1935  3 Sheets-Sheet 3

Inventor
A. C. Lindgren
By V. F. Lassagne
Atty.

Patented May 12, 1936

2,040,699

UNITED STATES PATENT OFFICE 2,040,699

HARVESTER THRESHER

Alexus C. Lindgren, Chicago, Ill., assignor to International Harvester Company, a corporation of New Jersey Application March 15, 1935, Serial No. 11,312

32 Claims. (Cl. 56—122)

The invention relates to harvester threshers and particularly to an improved construction of the harvester platform and the manner of flexibly associating the same with the thresher part of the machine so that it will function efficiently in cutting the grain when working on hilly ground.

The main object of the invention is to provide an improved harvester platform structure for harvester threshers.

Another object is to provide an improved structure for flexibly associating the said harvester platform with the thresher part of the machine.

Still another object is to provide such a harvester platform that will work efficiently in connection with hillside harvester threshers.

It is also an object to torsionally carry the weight of the platform in an improved and simplified manner.

Other equally important objects will be apparent to those skilled in this art as the disclosure is more fully made.

These objects may be attained briefly by providing a transversely extending A-frame structure hingedly connected at two points with the thresher part, said frame having one leg in the form of a torque tube support for carrying the platform while the other leg of the A-frame constitutes a diagonal brace bar. A torque arm has one end secured to the torque tube while its other end is detachably anchored to the brace bar or to some other convenient fixed point on the machine. In this fashion, one end of the torque tube support is anchored to permit the weight of the platform offset at its other end to be torsionally sprung by the tube. The tube carries line levers for carrying the platform, there being linkage associated with the tube to maintain the platform substantially horizontal in all positions of cutting range adjustment. Such adjustment of the platform is effected by a usual form of tiller wheel and rack bar, the weight of the platform being counterbalanced by weight beams associated with the torque tube support.

So much of the structure will suffice in presenting an idea of the invention which has been particularly illustrated in the accompanying sheets of drawings. The practicable example of the platform structure chosen for illustration in the drawings is shown associated with a hillside type of harvester thresher, although it is to be understood that the platform will function equally well with the so-called prairie type of machine where extreme land slopes do not have to be negotiated.

In the drawings:

Figure 1 is a general plan view of the improved harvester part associated with the thresher part of a hillside type of harvester thresher;

Figure 2 is a rear elevational view of the machine as it appears working on a hillside;

Figure 3 is a fragmentary detail plan view showing the platform detached from its normal cutting position and being towed behind the thresher part for transport over roads and through narrow places;

Figure 4 is an enlarged plan view showing the platform and its flexible connection with the thresher part;

Figure 5:
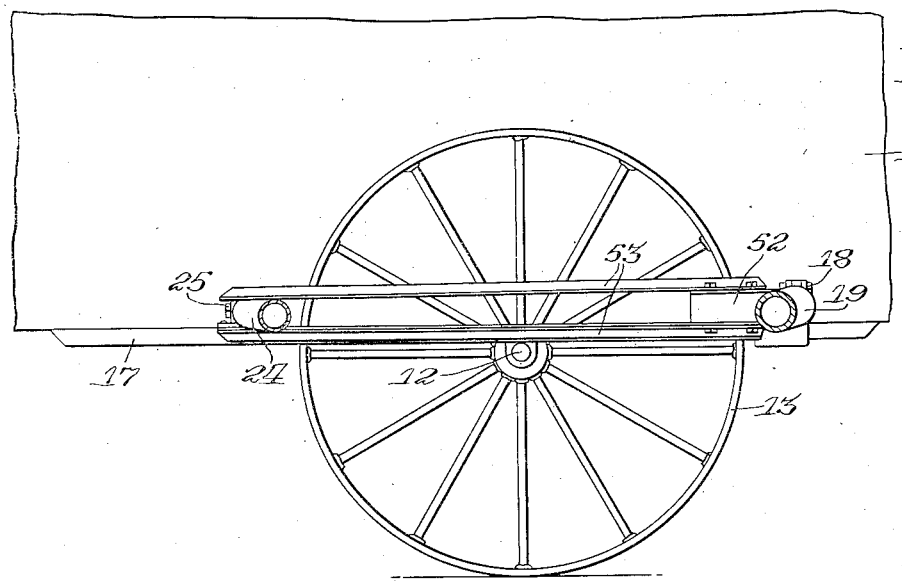
Figure 5 is a detail vertical view, partly in section, taken along the longitudinal section line 5—5 of Figure 4 looking in the direction of the arrows.

The harvester thresher herein illustrated comprises the usual longitudinally extending thresher part 10 having its front end supported on a steering wheel truck 11 and its rear end carried on a divided axle 12 journaled in a main wheel 13 for supporting the grainward side of the thresher part. The divided axle 12 includes a crank axle portion 14 carrying a wheel 15 thereon for supporting the stubbleward side of the thresher part 10. The cranked axle 14 may be moved by suitable power connections 16 up or down as is common in hillside harvester threshers to maintain the thresher body 10 substantially horizontal when operating on hillsides, as shown in Figure 2.

The thresher part 10 includes a frame structure 17 which embraces the main wheel 13, as best shown in Figure 4. At a point on this frame structure 17 in advance of the wheel 13 is a longitudinal hinge pin 18 to which is hingedly connected for up and down floating movement a diagonally and transversely extending torsional member 19 comprising a torque tube harvester platform support, as will subsequently appear. The support 19 is extended diagonally rearwardly in the line of draft, as shown in Figure 4, and at its outer end is associated with a stub axle 20 that is transversely disposed and on which is journaled a grain wheel 21. The stub axle structure 20 includes a boss 22 on which is detachably mounted by a pin 23 the grainward end of a diagonal rearwardly and transversely disposed brace member 24 which has its stubbleward end hinged to the frame 17 by means of a longitudinal pivot pin 25.

Figure 7:
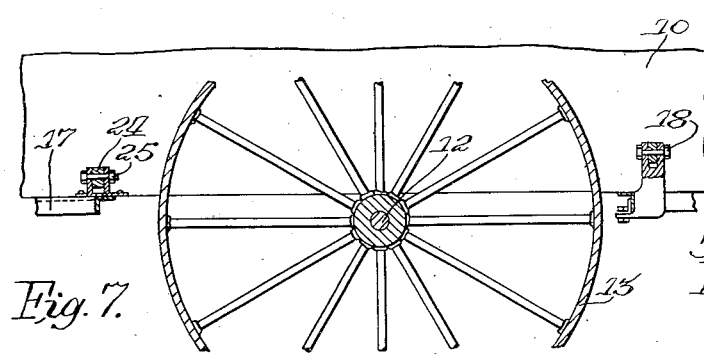

It can now be seen that the torque tube 19 and the brace 24 form a transversely extending A-frame which is supported at its outer end on the grain wheel 21 and at its inner end is hingedly associated with the thresher part by means of pivot pins 18 and 25. These pivot pins 18 and 25 preferably lie in the same longitudinal and vertical plane, or substantially so, which plane, as clearly indicated in Figure 4, also passes through the wheel 13. By looking at the pivots as shown in Figure 7, it can be seen that in addition the pivot pin 25 is disposed lower than the front pivot pin 18. The brace bar 24 at its grainward end can also be disconnected from the frame 17 by removing the pin 25. It will now be appreciated that the brace 24 at its stubbleward end is hinged on a longitudinal horizontal pivot and that at its grainward end it is pivoted to the vertical pivot pin 23. The said member 24, intermediately of its ends, has formed thereon a flange, or collar, 26 for a purpose later to appear.

Figure 6:
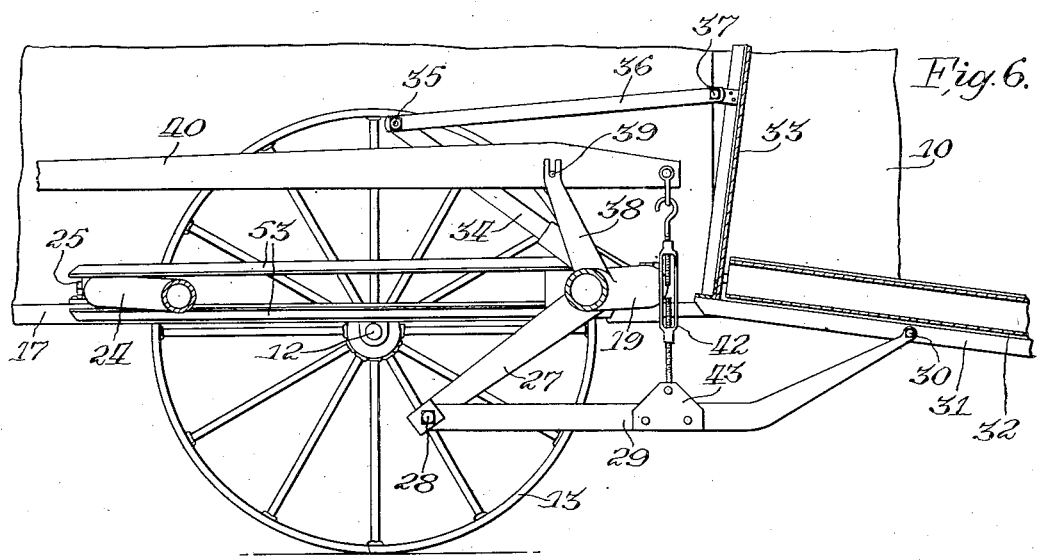
Figure 6 is a similar view through the platform structure taken along the line 6—6 of Figure 4 looking in the direction of the arrows; and, Figure 7 is another longitudinal sectional view taken along the line 7—7 of Figure 4 looking in the indicated direction.

As best shown in Figures 4 and 6, the torque tube 19 has connected thereto, as by welding, a pair of downwardly and rearwardly extending arms 27 which are spaced apart, as shown in Figure 4. To the rear ends of these arms 27, by means of pivot pins 28, are pivotally connected to said arms forwardly and upwardly extending line levers 29, which line levers extend under the torque tube 19. The forward ends of each of these two line levers 29 are bent upwardly, as shown in Figure 6, for pivotal connection at 30 to the frame members 31 of a harvester platform 32 which includes a backboard 33. It is to be observed that the two pivot pins 28 are in transverse alignment.

The torque tube 19 also has secured thereto, as by welding, adjacent each arm 27, an upwardly and rearwardly extending bracket 34, the free ends of which carry pivot pins 35, also in transverse alignment, for pivotally receiving the rear ends of forwardly extending links 36, which have their front ends pivotally connected at 37 to the backboard 33 of the platform, as appears best in Figure 6.

Between the arms 27, the torque tube 19 carries two upstanding yokes 38 each carrying a pivot pin 39 for fulcruming, intermediately of their ends, a pair of counterbalance beams 40 which extend diagonally rearwardly and converge to carry a weight 41. The fulcrums of the beams 40 on the pins 39 are also in transverse alignment, and in fact, such point of fulcruming on each yoke 38 lies in a transverse vertical plane which intersects a vertical plane in which the axis of the torque tube 19 lies. The forward ends of each of the beams 40 carry a depending adjustable turnbuckle link 42 respectively connected, through the intermediary of brackets 43, to the line levers 29, as shown in Figure 6.

It will now be clear that the weighted beams 40 serve as a counterbalance structure to carry the weight of the platform 32 on the torque tube 19. The stubbleward end of the platform structure, as shown in Figure 1, carries a conventional frame piece 44 having connection with a rack bar 45 operable by a tiller wheel 46 from an operator's platform 47 on top of the thresher part 10 for raising and lowering the platform 32 to adjust its cutting range in accordance with the varying height of grain encountered during operation of the harvester thresher. As the platform is thus adjusted up or down, the weight beams 40 serve to counterbalance the weight of the platform in a manner well understood in this art.

The harvester platform, as shown in Figures 1 and 6, includes the usual cutting apparatus at its front edge indicated at 48, there being a reel 49 mounted above the platform, and at the stubbleward end of the platform is a spout or elevator 50 for conveying the harvested crop into the thresher part 10. The line levers 29, as shown in Figure 4, are suitably interbraced by the braces 51 to make the construction as rigid as possible to prevent warping and sagging of the platform.

As most of the weight of a harvester platform is arranged forwardly of the torque tube 19 adjacent its grainward end, it is obvious that this great weight sets up a torque or torsional strain in the tube 19. This twisting strain is advantageously employed in the adjusting operation of the platform but to be fully effective it must be restrained, and, accordingly, the stubbleward end of the torque tube 19 has welded thereto, as shown in Figures 4 and 5, a bracket 52 to which is bolted a pair of longitudinal rearwardly extending spaced bars 53 which are open at their rear ends so that the brace 24 may be passed therebetween as indicated in Figure 5. The bar 53 thus is permanently secured to the torque tube 19 and anchored to the brace 24 or some other suitable rigid, stationary point on the machine and serves as a torque holding arm. For this reason the bar 53 is referred to as a torque arm.

The torque arm 19 carries a sleeve 54 which is adapted to receive the axle 55 of a wheel support 56, indicated in dotted lines in Figure 1. When the A-frame structure 19 and 24 is disconnected from the thresher part by removing the pins 18 and 25, the weight of the platform is carried on this axle 55 and the wheel truck 56 for transporting the harvester platform structure by means of the detachable brace 24 which now serves as a tongue 24', as indicated in Figure 1. This tongue 24' is attached to a draw hook 57 at the rear end of the thresher body, as shown in Figure 3, and then when the thresher body is pulled in transport position the harvester part will trail therebehind, as shown in Figure 3. One of the wheels 56 in practice would be the wheel 21 and the collar 26, heretofore described, serves as an abutment for the end of the platform structure, as indicated in Figures 1 and 3 in this transport position of the parts. Such detachment and transport of the harvester part from the thresher part is necessary when moving this machine over highways and through narrow places and when moving the machine from one field to another.

The operating condition of the machine and especially the improved platform mounting is best shown in Figure 4, where it can be seen that the A-frame support for the harvester platform comprises the torque tube 19 and the brace 24 which constitute a unitary structure that may flexibly move up or down about the hinges 18 and 25 in relation to the thresher part when operating on side hills, thus making it certain that the cutting apparatus 48 along the front edge of the platform will always be properly presented to cut the grain. The fact that the pivot 25 is somewhat lower than the pivot 18 makes the platform conform properly to the ground contour when the machine is running on side hills. The torque developed in the tube 19 by the offset weight of the platform is held by the oppositely offset torque arm 53 which in this embodiment of the invention is anchored to the brace 24. The links 36 serve to maintain the platform 32 substantially horizontal in all of its up and down positions of adjustment, which adjustments, as has been said, are made by the manually adjustable rack bar 45 and frame piece 44, the weight 41 associated with the beams 40 serving to counterbalance the weight of the platform to make such adjustments easy. The diagonal disposition of the torque tube 19 makes it possible substantially to narrow the width of the harvester part without sacrificing the width of the swath to be cut, and locating the pivots 18 and 25 forwardly and in back of the wheel 13 further makes it possible to present the harvester platform properly for cutting on side hills.

From this detailed description, it will now be apparent that an improved platform supporting structure has been provided for harvester threshers which attains all of the desirable objects heretofore recited, and that such structure is simple and effectively permits the platform in all conditions of side hill operation properly to be presented to the grain for gathering the same. While the platform supporting structure has herein been shown in connection with a hillside type of machine, it may obviously be equally well employed with the so-called prairie type of thresher where extreme sloping land conditions are not encountered.

It is the intention to cover all changes and modifications of the example of the invention herein shown which do not depart from the spirit and scope of said invention as indicated by the definitions thereof comprising the appended claims.

What is claimed is:

1. A harvester thresher having a longitudinal thresher part, an A-frame harvester support hingedly associated with the thresher part, one leg of the A-frame comprising a torque tube and the other leg constituting a brace, a harvester platform supported on the tube, and a torque arm connected between the tube and brace.

2. A harvester thresher having a longitudinal thresher part, an A-frame harvester support extending transversely of the thresher part and having its outer end carried by a ground wheel, one leg of the A-frame comprising a torsional member connected by a hinge to the thresher part, the other leg comprising a brace connected by a hinge to the thresher part, said hinges being disposed in substantially the same longitudinal vertical plane, a harvester platform supported on the torsional member, and a longitudinal arm connected between the torsion member and brace.

3. A harvester thresher having a longitudinal thresher part, an A-frame harvester support extending transversely of the thresher part and having its outer end carried by a wheel, one leg of the A-frame comprising a torsional member connected by a hinge to the thresher part, the other leg comprising a brace connected by a hinge to the thresher part, said hinges being disposed in substantially the same longitudinal vertical plane, one of said hinges being lower than the other, a harvester platform supported on the torsional member, and a torque arm connected between the torsion member and brace.

4. A harvester thresher having a longitudinal thresher part, an A-frame harvester support extending transversely of the thresher part and having its outer end carried by a wheel, one leg of the A-frame comprising a torsional member connected by a hinge to the thresher part, the other leg comprising a brace connected by a hinge to the thresher part, said hinges being disposed in substantially the same longitudinal vertical plane, the rear one of said hinges being lower than the front hinge, a harvester platform supported on the torsional member, and a torque arm rigidly connected at one end to the torsion member, said arm having its other end detachably connected with the brace.

5. A harvester thresher having a longitudinal thresher part including a frame, a wheel supporting the grainward side of said thresher part, said frame having a portion embracing the wheel, a laterally extending torque tube harvester support hingedly connected with the frame in advance of the wheel, a brace having one end connected to the outer end of the support and its other end hingedly connected with the frame at a point rearwardly of said wheel, an arm adjacent the wheel and connected between the support brace, and a harvester platform supported on said support for up and down movement, and a weighted counterbalance arm fulcrumed on the torque tube support and operatively connected with said platform.

6. A harvester thresher having a longitudinal thresher part including a frame, a wheel supporting the grainward side of said thresher part, said frame having a portion embracing the wheel, a laterally and diagonally extending torque tube harvester support hingedly connected with the frame in advance of the wheel, a brace having one end connected to the outer end of the support and its other end hingedly connected with the frame at a point rearwardly of said wheel, an arm adjacent the wheel and connected between the support brace, and a harvester platform supported on said support for up and down movement, and a weighted counterbalance arm carried on the torque tube and connected operatively with said platform.

7. A harvester thresher having a longitudinal thresher part including a frame, a wheel supporting the grainward side of said thresher part, said frame having a portion embracing the wheel, a torque tube hingedly connected with the frame in advance of the wheel, a brace having one end detachably associated with the outer end of the support and its other end hingedly connected with the frame at a point rearwardly of said wheel, a torque arm attached to the support and removably connected with the brace, and a harvester platform carried by said support.

8. A harvester thresher having a longitudinal thresher part including a frame, a wheel supporting the grainward side of said thresher part, said frame having a portion embracing the wheel, a laterally extending harvester support tube having a direct hinged connection with the frame at a point in advance of the wheel, a brace associated with the support and having one end attached by a hinged connection with the frame at a point rearwardly of said wheel, said two hinged connections lying in a vertical plane passing through said wheel, and a harvester platform carried torsionally by said support.

9. A harvester thresher having a longitudinal thresher part including a frame, a wheel supporting the grainward side of said thresher part, said frame having a portion embracing the wheel, a laterally extending harvester support comprising a torque tube having a hinged connection with the frame at a point in advance of the wheel, a brace associated with the support and having one end attached by a hinged connection with the frame at a point rearwardly of said wheel, said two hinged connections lying in substantially the same longitudinal vertical plane passed through said wheel, a torque arm connected between the torque tube and brace, and a harvester platform carried by said support.

10. A harvester thresher having a longitudinal thresher part including a frame, a wheel supporting the grainward side of the thresher part, said frame having a portion embracing the wheel, a transversely and diagonally extending torsional support hingedly connected to the frame adjacent the wheel and forwardly thereof, a grain wheel carrying the outer end of said support, a brace connected between the support and frame, a torque arm having one end attached to the support and its other end adapted to be anchored rigidly to an appropriate fixed point adjacent the first wheel, and a harvester platform carried by said torsional support.

11. A harvester thresher having a longitudinal thresher part including a frame, a wheel supporting the grainward side of the thresher part, said frame having a portion embracing the wheel, a transversely and diagonally extending torsional support hingedly connected to the frame adjacent the wheel and forwardly thereof, a grain wheel carrying the outer end of said support, a transversely and diagonally extending brace connected between the support and frame, a substantially longitudinal torque arm secured to the torsional support and having its rear end formed to detachably but rigidly receive said brace, and a harvester platform carried by said torsional support.

12. A harvester thresher comprising a longitudinal thresher part, a diagonally disposed transversely extending torsional harvester support hingedly associated with the thresher part, rearwardly and downwardly extended arms carried by the support in spaced relation, forwardly extending line levers pivotally connected to the arms along a common transverse axis, said levers arranged below the support, a harvester platform carried on the forward ends of said levers, and a counterbalance carried by the support and associated with the levers to balance the weight of the platform.

13. A harvester thresher comprising a longitudinal thresher part, a diagonally disposed transversely extending torsional harvester support hingedly associated with the thresher part, rearwardly and downwardly extended arms carried by the support in spaced relation, forwardly extending line levers pivotally connected to the rear ends of the arms along a common transverse axis, said levers being located below the support, a harvester platform pivotally carried on the forward ends of said levers, and a counterbalance carried by the support and associated with the levers to balance the weight of the platform.

14. A harvester thresher comprising a longitudinal thresher part, a transversely extending torque tube support hingedly associated with the thresher part, means for hingedly associating a pair of forwardly extending line levers with the support, a diagonal brace connected between the support and thresher part, a harvester platform carried by the line levers, a counterbalance for the platform carried on the support, and a torque arm connected between the support and the brace.

15. A harvester thresher comprising a longitudinal thresher part having a wheel to support its grainward side, a torque tube support hingedly associated with the thresher part at a point forwardly of the wheel and extending transversely of the thresher part, means for hingedly associating forwardly extending line levers with the support, a diagonal brace connected between the support and with the thresher part rearwardly of said wheel, a harvester platform carried by the line levers, a counterbalance for the platform carried by the support, and means associated with one end of the support to restrain the torque developed therein by the weight of the platform.

16. A harvester thresher comprising a longitudinal thresher part, a transversely and diagonally extending support hingedly associated with the thresher part, a pair of spaced arms connected to the support and extending rearwardly therefrom, forwardly extending line levers extending under the support and pivotally connected on transversely aligned axes to the free ends of said arms, brackets on the support arranged one adjacent each arm, a platform pivotally mounted on the front ends of the line levers, links pivoted to the free ends of the brackets along a common transverse axis, said links extending forwardly over the support and having connection with the platform, a counterbalance for the platform carried by the support, and means to adjust the platform, said links serving to maintain the platform substantially horizontal.

17. A harvester thresher comprising a longitudinal thresher part, a transversely and diagonally extending support hingedly associated with the thresher part, a pair of spaced arms connected to the support and extending rearwardly therefrom, forwardly extending line levers extending under the support and pivotally connected on transversely aligned axes to the free ends of said arms, brackets on the support arranged one adjacent each arm, a platform pivotally mounted on the front ends of the line levers, links pivoted to the free ends of the brackets along a common transverse axis, said links extending forwardly over the support and having connection with the platform, a counterbalance for the platform comprising a pair of weighted arms fulcrumed on spaced transversely aligned points on the support, the axial line passing through said points intersecting the vertical plane in which the axis of the support lies, means connecting the weighted arms to the line levers, and means to adjust the platform, said links serving to maintain the platform substantially horizontal.

18. A harvester thresher comprising a longitudinal thresher part, a transversely and diagonally extending torque tube support hingedly associated with the thresher part, a pair of spaced arms connected to the support and extending rearwardly therefrom, forwardly extending line levers extending under the support and pivotally connected on transversely aligned axes to the free ends of said arms, brackets on the support arranged one adjacent each arm, a platform pivotally mounted on the front ends of the line levers, links pivoted to the free ends of the brackets along a common transverse axis, said links extending forwardly over the support and having connection with the platform, a counterbalance carried by the support and associated with the platform to balance the same, means to adjust the platform, said links serving to keep the platform substantially horizontal, and means associated with the stubbleward end of the torque tube support to hold the torque developed therein by the weight of the platform.

19. A harvester thresher having a longitudinal thresher part, a torque tube support hinged thereto and extending laterally therefrom, an adjustable counterbalanced platform carried by the support in a position forwardly thereof to develop torque in the tube, and means associated with the stubbleward end of the tube and comprising a rigid member extending rearwardly therefrom and adapted to be anchored to a point on the harvester thresher to hold the torque so developed in said tube.

20. A harvester thresher having a longitudinal thresher part, a torque tube support hinged thereto and extending laterally and diagonally therefrom, an adjustable counterbalanced platform carried by the support in a position forwardly thereof to develop torque in the tube, and a rigid member carried by the stubbleward end of the tube and extending rearwardly therefrom, said member including means adapted to be anchored to a fixed point on the machine to hold the torque so developed in said tube.

21. A harvester thresher having a thresher part, a transverse A-frame support structure hingedly connected to the thresher part at two spaced points which lie in the same longitudinal vertical plane, an adjustable counterbalanced platform carried by the support structure, a grain wheel carrying the angle of the A-frame, and a cross connection between the legs of the A-frame adjacent the connection thereof with the thresher part.

22. A harvester thresher having a hingedly mounted A-frame harvester support for flexibly carrying a harvester platform, one leg of the A-frame comprising a torque tube and the other comprising a brace, and a torque arm connected between the torque tube and the machine.

23. A harvester thresher having a diagonal torque tube support carrying a counterbalanced harvester platform, and a rigid member connected to the tube and a point on the machine to hold the torque developed in the tube.

24. A harvester thresher having a torque tube support arranged transversely and diagonally of the line of draft, a harvester platform carried by the support forwardly thereof, counterbalance means on the support rearward thereof to develop torque therein, and means connected between the support and the machine to the rear of the support to hold the torque developed in the support.

25. A harvester thresher having a longitudinal thresher body, a torque tube support hinged to the body and extending laterally therefrom, line levers connected to the support for up and down movement and extending forwardly of the support, a harvester platform carried at the forward ends of said levers, a counterbalance operatively associated with the support and line levers to counterbalance the weight of the platform and develop torque in the tube support, and a rigid member connected between the tube and a fixed point on the harvester thresher to restrain the torque so developed in the tube.

26. A harvester thresher having a longitudinal thresher body, a torque tube support hinged to the body and extending laterally therefrom, line levers connected to the support for up and down movement and extending forwardly of the support, a harvester platform carried at the forward ends of said levers, a counterbalance operatively associated with the support and line levers to counterbalance the weight of the platform and develop torque in the tube support, and a rearwardly extending rigid torque restraining arm connected rigidly between the stubbleward end of the tube support and a point on the harvester thresher.

27. A harvester thresher having a longitudinal thresher body, a torque tube support hinged to the body and extending laterally therefrom, forwardly extending spaced line levers connected to and carried by the support, an X-frame cross-bracing said levers, a harvester platform mounted on said levers, a counterbalance operatively associated with the support and the line levers to counterbalance the weight of the platform and to develop torque in the support, and means connected between the support and a point on the harvester thresher to restrain the torque so developed in the support.

28. A harvester thresher having a longitudinal thresher body, a torque tube support hinged to the body and extending laterally therefrom, forwardly extending spaced line levers connected to and carried by the support, an X-frame cross-bracing said levers, a harvester platform mounted on said levers, a counterbalance operatively associated with the support and the line levers to counterbalance the weight of the platform and to develop torque in the support, means connected rigidly between the support and a point on the harvester thresher to restrain the torque so developed in the support, means for vertically adjusting the platform with the line levers, and means for maintaining said platform parallel with the ground during the adjustment thereof.

29. A harvester having a body, a transversely and diagonally extending harvester support hingedly connected to the body, a brace connected between the support and body to form a floating A-frame the apex of which is remote from the body and wheel supported, spaced forwardly extending line levers hingedly supported from the support, an X-frame cross-bracing the line levers, a harvester platform carried on the levers, means on the body connected to raise and lower the platform, and angularly related weighted counterbalance arms disposed over the A-frame and fulcrumed on the support, said arms being respectively connected to the line levers.

30. A harvester having a body, a transversely and diagonally extending torsional harvester support hingedly connected to the body, a diagonal brace connected between the support and body to form a floating A-frame the apex of which is wheel supported, spaced forwardly extending line levers hingedly related to the support, a brace structure interconnecting the line levers, a harvester platform carried on the line levers, means for raising and lowering the platform, a counterbalance mounted on the support and connected to the line levers, said counterbalance and platform being so related as to develop torque in the support, and means included in the harvester and connected with the support to restrain the torque developed in the support.

31. A harvester having a body, a transversely and diagonally extending torsional harvester support hingedly connected to the body, a diagonal brace connected between the support and body to form a floating A-frame the apex of which is wheel supported, spaced forwardly extending line levers hingedly related to the support, a brace structure interconnecting the line levers, a harvester platform pivotally carried on the front ends of said line levers, means for raising and lowering the platform, means for keeping the platform in all of its positions of adjustment substantially parallel with the ground, a counterbalance operatively associated with the support and platform, said platform and counterbalance being so related as to develop torque in the support, and means included in the harvester and connected with the support to restrain the torque developed in the support.

32. A harvester thresher comprising a longitudinal body carried on an axle and a grainward wheel, a transversely disposed torsional support hingedly connected to the body at a point forwardly of the wheel and extending transversely thereof, an outer wheel supporting the free end of said support, a brace connected between the support and body, spaced forwardly extending line levers hingedly carried by the support, a harvester platform mounted on the line levers, means for raising and lowering the platform, a counterbalance mounted on the support and connected with the line levers, said counterbalance and platform being so related as to develop torque in the support, and means included in the harvester thresher and rigidly connected with the support to restrain the torque developed in the support.

ALEXUS C. LINDGREN.